United States Patent
Chang et al.

(10) Patent No.: US 11,037,013 B2
(45) Date of Patent: Jun. 15, 2021

(54) CAMERA AND IMAGE PROCESSING METHOD OF CAMERA

(71) Applicant: HANWHA TECHWIN CO., LTD., Seongnam-si (KR)

(72) Inventors: Yil Kwon Chang, Seongnam-si (KR); Seung In Noh, Seongnam-si (KR); Young Hyun Lee, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 65 days.

(21) Appl. No.: 16/478,392

(22) PCT Filed: Jan. 19, 2018

(86) PCT No.: PCT/KR2018/000909
§ 371 (c)(1),
(2) Date: Jul. 16, 2019

(87) PCT Pub. No.: WO2018/135906
PCT Pub. Date: Jul. 26, 2018

(65) Prior Publication Data
US 2019/0370591 A1     Dec. 5, 2019

(30) Foreign Application Priority Data
Jan. 20, 2017    (KR) .................. 10-2017-0009932

(51) Int. Cl.
G06K 9/32        (2006.01)
G06K 9/00        (2006.01)
G06T 3/40        (2006.01)

(52) U.S. Cl.
CPC ....... *G06K 9/3233* (2013.01); *G06K 9/00771* (2013.01); *G06T 3/40* (2013.01)

(58) Field of Classification Search
CPC ............ G06K 9/3233; G06K 9/00771; G06K 9/00228; G06T 3/40; G06T 2207/30196; G06T 7/73
See application file for complete search history.

(56) References Cited

U.S. PATENT DOCUMENTS 8,687,887 B2     4/2014  Norimatsu et al.
2007/0211962 A1  9/2007  Bang et al.
(Continued)

FOREIGN PATENT DOCUMENTS

JP     2009-271758 A     11/2009
JP       5016541 B2       9/2012
(Continued)

OTHER PUBLICATIONS

International Search Report (PCT/ISA/210) dated Apr. 12, 2018 by the International Searching Authority in counterpart International Patent Application No. PCT/KR2018/000909.
(Continued)

*Primary Examiner* — Phuoc Tran
(74) *Attorney, Agent, or Firm* — Sughrue Mion, PLLC (57) ABSTRACT

Provided are a camera and an image processing method of the camera. According to an aspect of the present disclosure, an image processing method of a camera includes receiving region information; receiving image data extracted from a corresponding region of an original resolution image corresponding to a region set according to the region information regarding an input image; and analyzing image data of the original resolution image and detecting an object corresponding to a set condition.

20 Claims, 10 Drawing Sheets

(56) References Cited

U.S. PATENT DOCUMENTS

| | | | | |
|---|---|---|---|---|
| 2009/0279738 | A1* | 11/2009 | Sasaki | H04N 19/51 382/103 |
| 2012/0027304 | A1* | 2/2012 | Brown | G06K 9/469 382/190 |
| 2014/0267435 | A1* | 9/2014 | Choe | G06T 11/60 345/660 |
| 2016/0180149 | A1 | 6/2016 | Yesugade et al. | |

FOREIGN PATENT DOCUMENTS

| | | |
|---|---|---|
| KR | 10-2004-0065753 A | 7/2004 |
| KR | 10-1081973 B1 | 11/2011 |
| KR | 10-1225062 B1 | 1/2013 |
| KR | 10-2013-0095727 A | 8/2013 |
| KR | 10-2014-0112774 A | 9/2014 |
| KR | 10-2016-0053155 A | 5/2016 |
| WO | 2012/013711 A2 | 2/2012 |

OTHER PUBLICATIONS

Written Opinion (PCT/ISA/237) dated Apr. 12, 2018 by the International Searching Authority in counterpart International Patent Application No. PCT/KR2018/000909.

* cited by examiner

CAMERA AND IMAGE PROCESSING METHOD OF CAMERA

CROSS-REFERENCE TO RELATED APPLICATION

This is a National Stage Entry of International Application No. PCT/KR2018/000909 filed on Jan. 19, 2018, claiming priority based on Korean Patent Application No. 10-2017-0009932 filed on Jan. 20, 2017, the contents of all of which are incorporated herein by reference in their entirety.

TECHNICAL FIELD

The present disclosure relates to a camera and an image processing method thereof.

BACKGROUND ART

Since a conventional object detecting system detects an object based on an entire captured image, the detectable sizes of an object are limited and it is difficult to detect a remote object including features needed for recognition within a short time.

DESCRIPTION OF EMBODIMENTS

Technical Problem

Provided are a camera capable of detecting an object quickly and accurately with a small amount of resources and a security system including the camera.

Solution to Problem

According to an aspect of the present disclosure, an image processing method of a camera includes receiving region information; receiving image data extracted from a corresponding region of an original resolution image corresponding to a region set according to the region information regarding an input image; and analyzing image data of the original resolution image and detecting an object corresponding to a set condition.

The method may further include displaying a minimum size of an object detectable in the region, the size varying according to the size of the region.

The minimum size of an object detectable in the region may vary in proportion to the size of the region.

The method may further include displaying a minimum size of an object detectable in the region, the size varying according to a type of an object to be detected.

The method may further include scheduling object detection for two or more regions.

The receiving of the region information may include receiving a position designated by a user as the region information.

The receiving of the region information may include receiving an event detected in the input image as the region information.

The position and the size of the region may vary according to an event occurring position and a size of an event occurring region.

The event may be a movement of the object.

According to an aspect of the present disclosure, a camera includes a region setter configured to receive region information and set a region; and a detector configured to receive image data extracted from a corresponding region of an original resolution image corresponding to a set region of an input image and analyze the image data of the original resolution image to detect an object corresponding to a set condition.

The region setter may display a minimum size of an object detectable in the region, the size varying according to the size of the region.

In the region setting unit, the minimum size of an object detectable in the region may vary in proportion to the size of the region.

The region setter may display a minimum size of an object detectable in the region, the size varying according to a type of an object to be detected.

The region setter may schedule object detection for two or more regions.

The region setter may receive a position designated by a user as the region information.

The region setter may receive an event detected in the input image as the region information.

The position and the size of the region may vary according to an event occurring position and a size of an event occurring region.

The event may be a movement of the object.

According to an aspect of the present disclosure, an image processing method of a server includes receiving a second resolution image obtained by changing a first resolution image having a original resolution from a camera; transmitting setting information for setting a region to the camera; receiving image data extracted from a corresponding region of the first resolution image corresponding to a set region of the second resolution image based on the setting information; analyzing the extracted image data and detecting an object corresponding to a set condition; and displaying an object detected based on the first resolution image in the second resolution image on a display.

The server may display the minimum size of an object detectable in the region that varies according to at least one of the size of the region and the type of an object to be detected in the region.

Advantageous Effects of Disclosure

A camera according to embodiments of the present disclosure may reduce the processing cost by excluding processing at unnecessary positions by designating a position where an object detection is needed and may analyze smaller objects in a screen image.

BEST MODE

According to an aspect of the present disclosure, an image processing method of a camera includes receiving region information; receiving image data extracted from a corresponding region of an original resolution image corresponding to a region set according to the region information regarding an input image; and analyzing image data of the original resolution image and detecting an object corresponding to a set condition.

MODE OF DISCLOSURE

The present disclosure may include various embodiments and modifications, and embodiments thereof will be illustrated in the drawings and will be described herein in detail. However, this is not intended to limit the present disclosure to particular modes of practice, and it is to be appreciated that all changes, equivalents, and substitutes that do not depart from the spirit and technical scope of the inventive concept are encompassed in the present disclosure. In the description of the present disclosure, certain detailed explanations of the related art are omitted when it is deemed that they may unnecessarily obscure the essence of the present disclosure.

While such terms as "first," "second," etc., may be used to describe various elements, such elements must not be limited to the above terms. The above terms may be used only to distinguish one element from another.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the invention may be implemented with any programming or scripting language such as C, C++, Java, assembler, or the like, with the various algorithms being implemented with any combination of data structures, objects, processes, routines or other programming elements. Functional blocks may be implemented in algorithms that are executed on one or more processors. Furthermore, the disclosure may employ any number of conventional techniques for electronics configuration, signal processing, and/or data processing. The words "mechanism", "element", "means", and "configuration" are used broadly and are not limited to mechanical or physical embodiments, but can include software routines in conjunction with processors, etc.

Hereinafter, the present disclosure will be described in detail with reference to the accompanying drawings.

Figure 1:
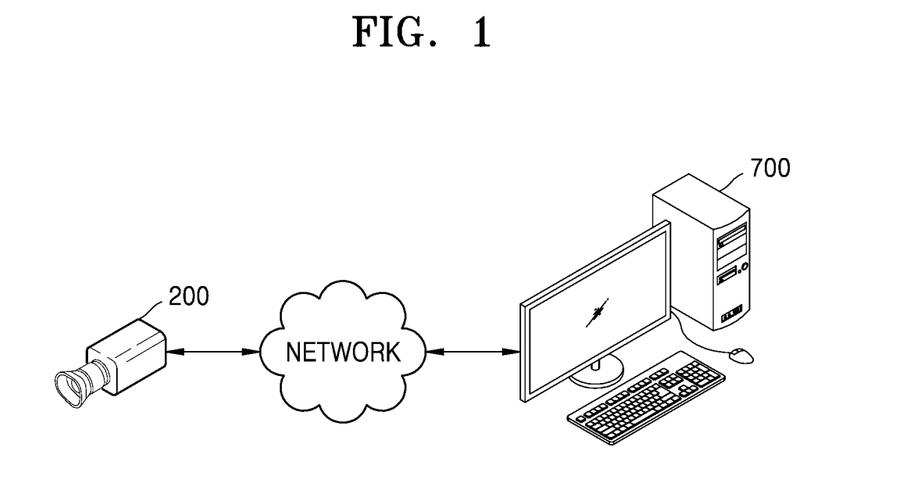
FIG. 1 is a diagram showing the configuration of a security system according to an embodiment of the present disclosure.

FIG. 1 is a diagram showing the configuration of a security system according to an embodiment of the present disclosure.

Referring to FIG. 1, a security system 100 of the present embodiment may include a camera 200 and a managing device 700. The camera 200 may be connected to the managing device 700 via a wire and/or a wireless network.

The camera 200 is integrally installed inside and outside offices, houses, hospitals, banks, and public buildings requiring security for access control and crime prevention and may have various forms like a straight type and a dome type depending on installation locations and purposes. The camera 100 is installed at a fixed location of a particular place and may be a single stationary camera having a fixed shooting range or a PTZ camera having panning/tilting/zooming functions. The camera 100 may be a surveillance camera including a visual camera, a thermal camera, a special purpose camera, a portable camera, a camcorder, etc. The camera 200 may include a digital video recorder (DVR) or a network video recorder (NVR) for storing captured images.

The camera 200 may obtain an image and detect an object in the obtained image. The camera 200 may detect an object by applying an object detection algorithm to the entire image or a portion of the image (a region of interest). The camera 200 may perform tracking and/or identification of a detected object. The region of interest may be fixed and may vary depending on a user's setting or on an occurring event. The camera 200 may operate in a region of interest fixed mode and/or a region of interest variable mode according to a user's setting.

In the region of interest fixed mode, the camera 200 may set a region of interest in an image according to a user's designation. The position and the size of a region of interest may be fixed in a current image and subsequent images until the region of interest is reset.

In the region of interest variable mode, the camera 200 may automatically set a region of interest in an image based on an occurring event. The camera 200 may automatically set a region of interest for each image in which a specified event occurs. The location and the size of the region of interest may vary depending on occurring locations of occurring events and sizes of regions in which events occur.

When an event occurs, the camera 200 may transmit a real-time alarm to the managing device 700 and may store an event image. The camera 200 may transmit an image, metadata, and/or event data to the managing device 700.

The managing device 700 may be connected to the camera 200 and request an image to the camera 200. The managing device 700 may receive images from the camera 200, provide the images to a display, and monitor displayed images. The managing device 700 may be a terminal like a personal computer, a smart phone, a tablet, and a handheld device or a server like a cloud server, a recording server, an upgrade server, and an alarm server.

The managing device 700 may perform object identification, object search, etc. based on images, metadata, and/or event data from the camera 200.

The managing device 700 may include an input device and a display. The input device may include a key pad, a dome switch, a touch pad (a contact capacitance type, a pressure resistive film type, an infrared ray detection type, a surface ultrasonic wave propagation type, an integral tension measuring type, a piezoelectric effect type, etc.), a mouse, a remote control, a jog wheel, a jog switch, etc. The display may include a liquid crystal display (LCD) panel, an organic light emitting display (OLED) panel, an electrophoretic display (EPD) panel, etc. The display may be provided as a touch screen to receive an input through a user's touch and may operate as a user input interface.

The managing device 700 may provide a graphical user interface on the display. The user may set functions of the camera 200 connected to the managing device 700 by inputting a time interval, a category (person, vehicle, etc.) of an object, a region of interest (ROI) in an image, a specific line, a specific direction, etc. as event conditions and/or object detection conditions through the graphical user interface by using the input device. For example, a user may designate certain points in an image displayed on the display by using the input device, and data regarding the points designated by the user may be transmitted to the camera 200 for setting a region of interest. The user may designate the position and the size of the set region of interest to be fixed or variable.

Figure 2:
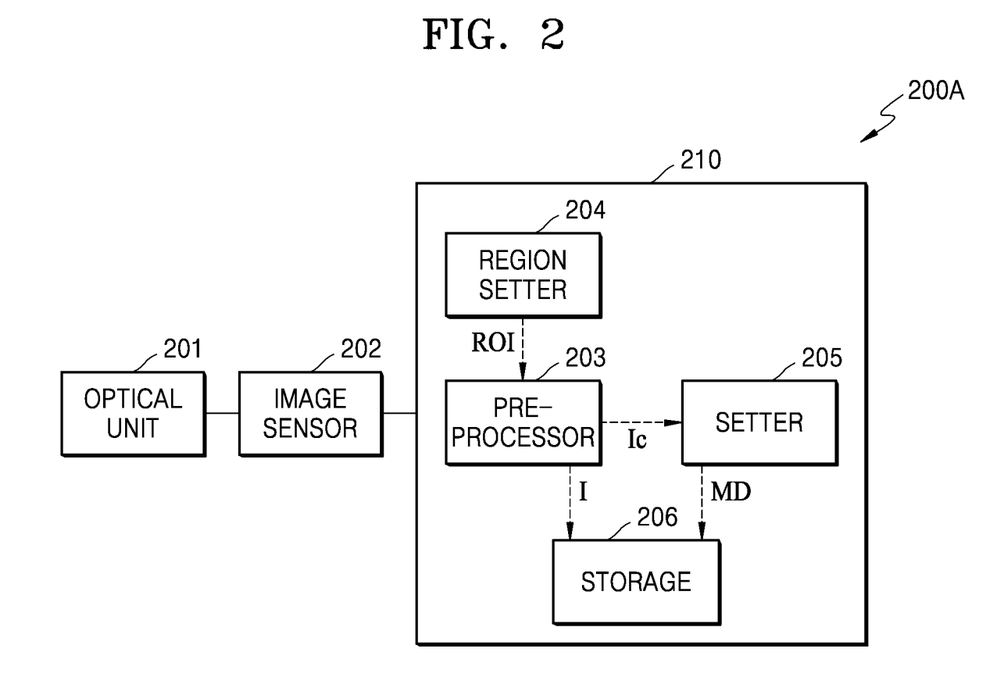
FIG. 2 is a block diagram schematically showing the configuration of a camera according to an embodiment of the present disclosure.
Figure 3:
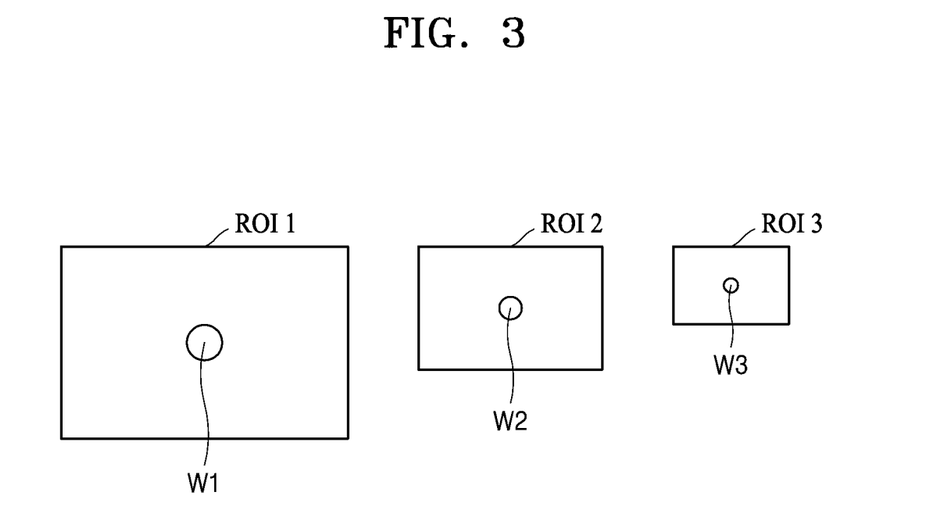
FIGS. 3 and 4 are diagrams for describing setting a region of interest in an image according to an embodiment of the present disclosure.
Figure 4:
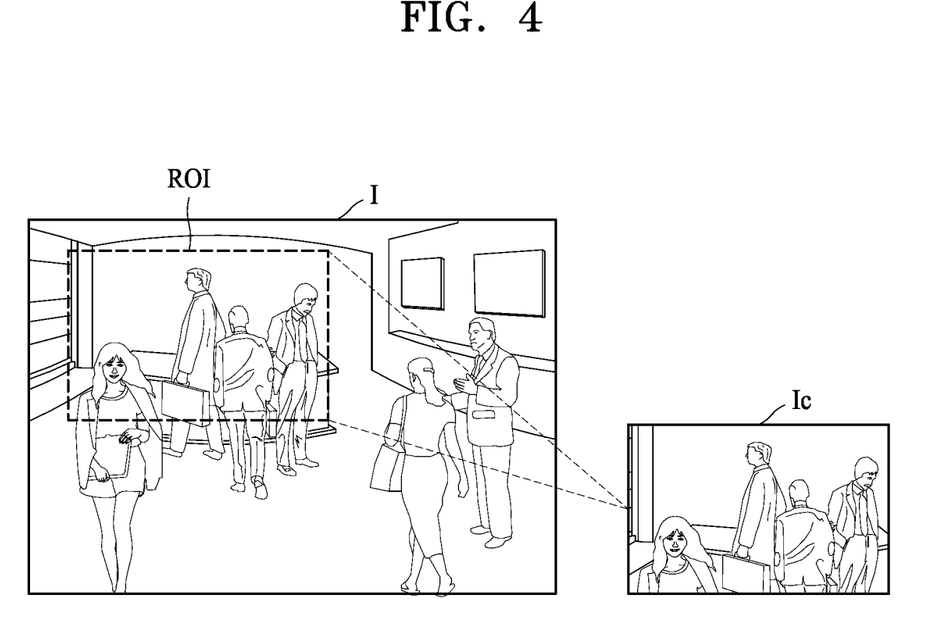

FIG. 2 is a schematic block diagram illustrating the configuration of a camera according to an embodiment of the present disclosure. FIGS. 3 and 4 are diagrams for describing setting a region of interest in an image according to an embodiment of the present disclosure. A camera 200A is an example of the camera 200 of the security system shown in FIG. 1.

Referring to FIG. 2, the camera 200A may include an optical unit 201, an image sensor 202, and an image processor 210.

The optical unit 201 may include optics like a zoom lens, a focus lens, and an iris for adjusting the amount of light.

The image sensor 202 may convert light transmitted through the optical unit 201 into an electrical image signal. The image sensor 202 may include an image pickup device like a charge coupled device (CCD) or a complementary metal-oxide semiconductor (CMOS).

The image processor 210 may be realized by any number of hardware and/or software components configured to perform the specified functions. For example, the image processor 210 may refer to a data processing device embedded in hardware, having circuitry physically structured to perform functions represented by code or instructions in a program. Examples of the data processing device embedded in hardware may include a microprocessor, a central processing unit (CPU), a processor core, a multiprocessor, an application-specific integrated circuit (ASIC), and a field programmable gate array (FPGA), but the present disclosure is not limited thereto.

The image processor 210 may include a pre-processor 203, a region setter 204, a detector 205, and a storage 206.

The pre-processor 203 may perform signal processing for image quality enhancement, such as noise removal, gamma correction, color filter interpolation, color correction, and color enhancement, on a digital image signal from the image sensor 202 or a digital image signal converted from an analog image signal from the image sensor 202. The pre-processor 203 may store a signal-processed image I in the storage 206. The resolution of the signal-processed image I is represented by the number of pixels in the horizontal and vertical directions, and the original resolution of the signal-processed image I may be a high resolution.

The region setter 204 may set a region of interest ROI in the signal-processed image I. The region setter 204 may receive region information for setting a region of interest ROI through a user's input. The region information may be point data regarding a plurality of points in an image. The region setter 204 may set a region connecting a plurality of points in an image as the region of interest ROI. The point data may be position information indicating positions of points in an image. The positions of points may be positions of particular pixels in the image. The region setter 204 may set a plurality of consecutive points as one region of interest ROI. The points for setting the region of interest ROI may be designated by a user. The position and size of the region of interest ROI may be fixed. The size (resolution) of the region of interest ROI may be less than or equal to the size (resolution) of the signal-processed image I. The resolution of the region of interest ROI may be limited by the resolution of an image that may be processed by the detector 205.

The region setter 204 may set one or more regions of interest ROIs in the signal-processed image I by setting each of groups of consecutive points input with time differences to a region of interest. A plurality of regions of interest ROIs may overlap one another at least partially. The region setter 204 may schedule the plurality of regions of interest ROIs by allocating an order to the plurality of regions of interest ROIs.

Referring to FIG. 3, when a region of interest is designated in an image, the region setter 204 may display windows W1, W2, and W3 each indicating a smallest detectable size of an object in regions of interest ROI1, ROI2, and ROI3, respectively. The size of a window may vary depending on at least one of the size of a region of interest and the type of an object to be detected. The size of a window may be proportional to the size of a region of interest.

For example, face detection and recognition based on a 2-dimensional image is based on unique feature points of a face. To find and use unique feature points, at least the minimum horizontal and vertical pixel resolutions including the eyes and the mouth in a face are needed. 20×20 or more pixels are needed for detection and 80×80 or more pixels are needed for recognition. There are very large number of sizes of faces that may be in an image. The range thereof may range from the minimum size of 20×20 pixels to the full screen size. In an embodiment of the present disclosure, a size for detecting and recognizing an object within the resolution (size) of a region of interest may be limited to a size of a certain ratio or greater.

When the size of a region of interest is too small to satisfy the minimum window size for face detection, the region setter 204 may not display a window in the region of interest or may display a warning. A user may determine the size of a region of interest based on the size of a window. Once the user makes a final decision on the region of interest, the region setter 204 may complete the setting of the region of interest.

Referring to FIG. 4, the pre-processor 203 may receive a region of interest setting signal from the region setter 204 and output a cropped image Ic generated by cropping a region of interest ROI from the signal-processed image I to the detector 205. When the size (resolution) of the cropped image Ic exceeds a reference size (resolution) for object detection, the pre-processor 203 may reduce the cropped image Ic to the size of the reference image.

The detector 205 may detect an object in the cropped image Ic. The detector 205 may scan the cropped image Ic and detect at least one object having a size equal to or greater than the minimum size that may be detected in the size of the cropped image Ic. The object may be a person, an animal, a vehicle, or a portion thereof (e.g., the face of a person) and may include a stationary object or a moving object. The detector 205 may detect one or more feature points in the cropped image Ic and detect an object by comparing information regarding the feature points with reference feature information per object. The method, performed by the detector 205, of detecting an object is not limited to the method described above.

The detector 205 may generate metadata MD, which is a set of object detection results. The metadata MD may include position information of an object detected in an image. The position information may include the center coordinates and the size of the object. The detector 205 may store the metadata MD in the storage 206. The detector 205 may match the metadata MD to the signal-processed image I and store the metadata MD matched to the signal-processed image I in the storage 206.

The storage 206 may store an image and the metadata MD. The metadata MD may be text and/or image-based data.

Figure 5:
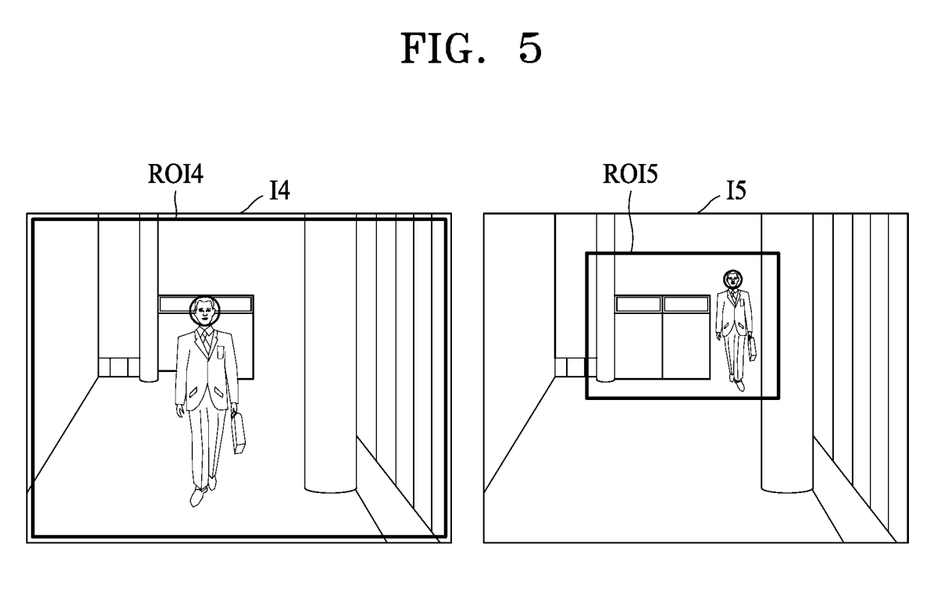
FIGS. 5 and 6 are diagrams exemplifying results that an object is detected in a region of interest set in an image by the camera shown in FIG. 2.
Figure 6:
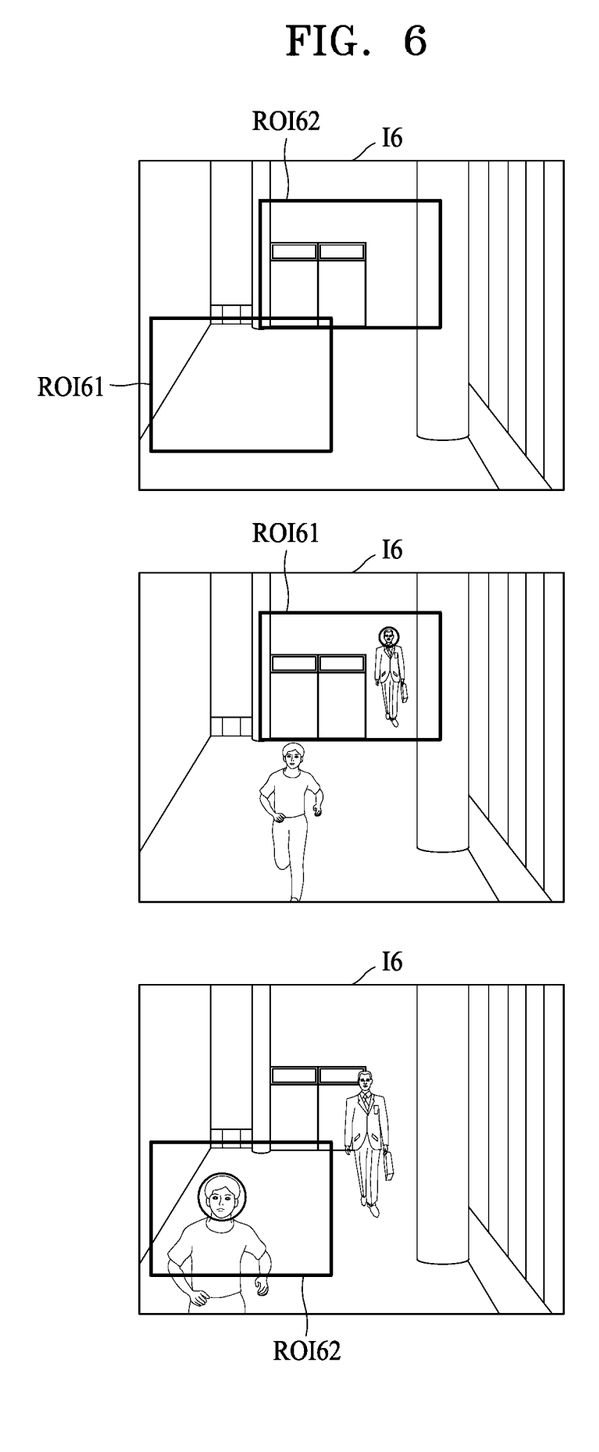

FIGS. 5 and 6 are diagrams exemplifying results that an object is detected in a region of interest set in an image by the camera shown in FIG. 2.

The embodiment shown in FIG. 5 is an example of detecting a face in a region of interest designated by a user in an image, where the size and the position of the region of interest are unchanged.

A camera 200A may set a region of interest ROI4 having a size similar to that of an image I4 or set a region of interest ROI5 having a size smaller than that of an image I5. The camera 200A may detect faces in set regions of interest ROI4 and ROI5 and display detected faces with certain marks (e.g., the circles shown in FIG. 5) in images I4 and I5.

The embodiment shown in FIG. 6 is an example of detecting faces in a plurality of regions of interest designated by a user in an image, where the sizes and the positions of the plurality of regions of interest are unchanged.

The camera 200A may set a first region of interest ROI61 and a second region of interest ROI62 within an image I6. The sizes and positions of the first region of interest ROI61 and the second region of interest ROI62 may differ. The camera 200A may assign the order for detecting a face in the first region of interest ROI61 ahead of the order for detecting a face in the second region of interest ROI62. The camera 200A may display a result of detecting a face in the first region of interest ROI61 first and subsequently display a result of detecting a face in the second region of interest ROI62 in the image I6. In another embodiment, the camera 200A may display results of detecting a face in regions of interest alternately by displaying a result of detecting a face in the first region of interest ROI61 in odd-numbered images and a result of detecting a face in the second region of interest ROI62 in even-numbered images.

Figure 7:
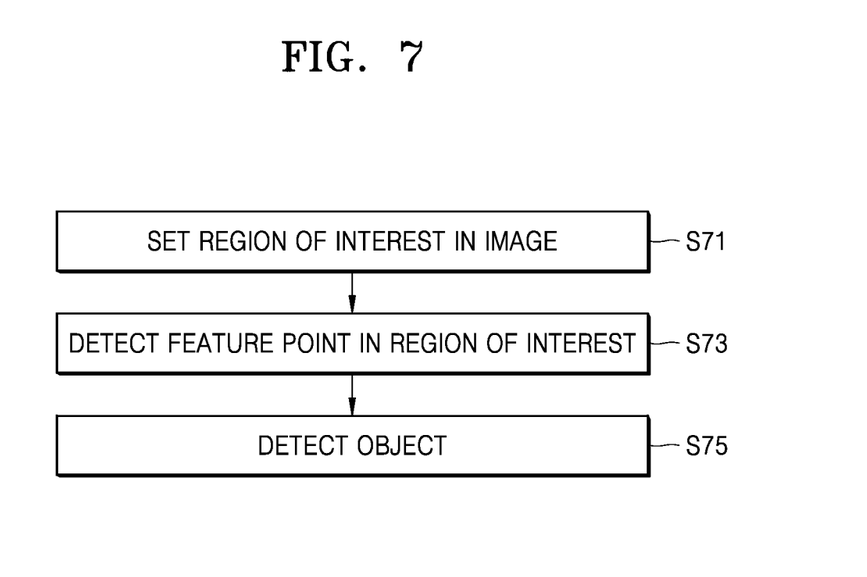
FIG. 7 is a schematic flowchart of an image processing method of a camera according to an embodiment of the present disclosure.

FIG. 7 is a flowchart of an image processing method of a camera, according to an embodiment of the present disclosure. Hereinafter, descriptions identical to those given above with reference to FIGS. 2 to 6 will be omitted.

Referring to FIG. 7, the camera 200A may set at least one region of interest in an input image (operation S71). The camera 200A may receive information regarding a region of interest designated by a user, e.g., data regarding points defining the region of interest, and may set a region of interest connecting the points. The position and size of the region of interest may be fixed.

The camera 200A may detect at least one feature point corresponding to a pre-set condition in image data within the region of interest (operation S73). The camera 200A may detect at least one feature point corresponding to the feature of an object to be detected in the region of interest.

The camera 200A may detect at least one object within the region of interest based on information regarding detected feature points (operation S75). The camera 200A may detect an object when the information regarding the feature points matches the feature information regarding the object to be detected.

Figure 8:
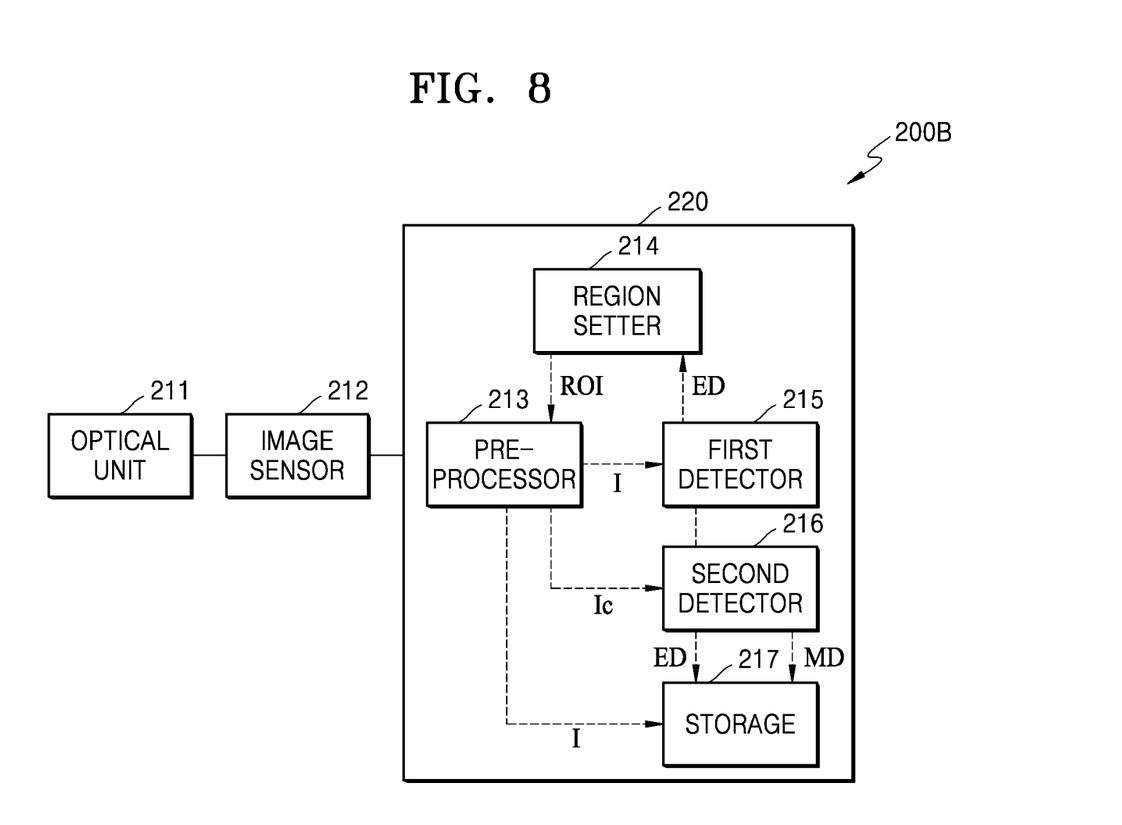
FIG. 8 is a schematic block diagram illustrating the configuration of a camera according to another embodiment of the present disclosure.
Figure 9A:
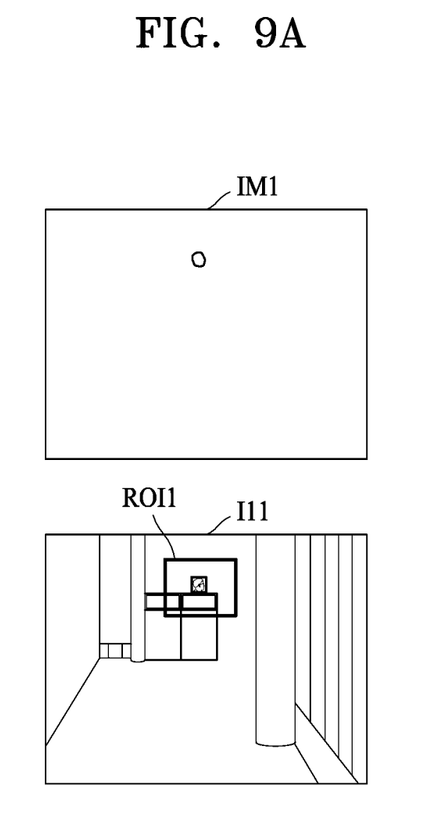
FIGS. 9A-9D illustrate diagrams exemplifying a result that an object is detected in a region of interest set in an image by the camera shown in FIG. 8.
Figure 9B:
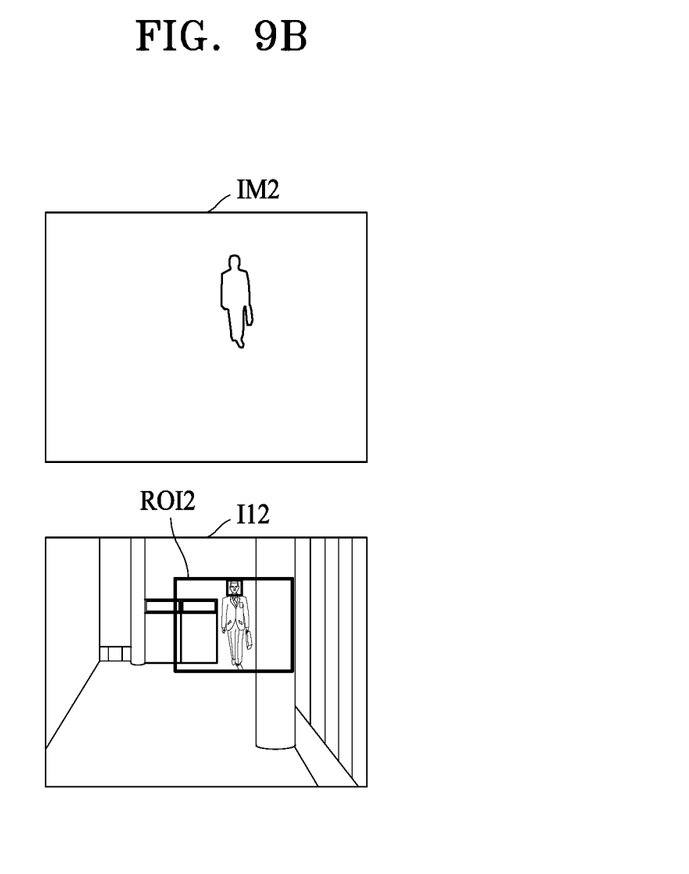
Figure 9C:
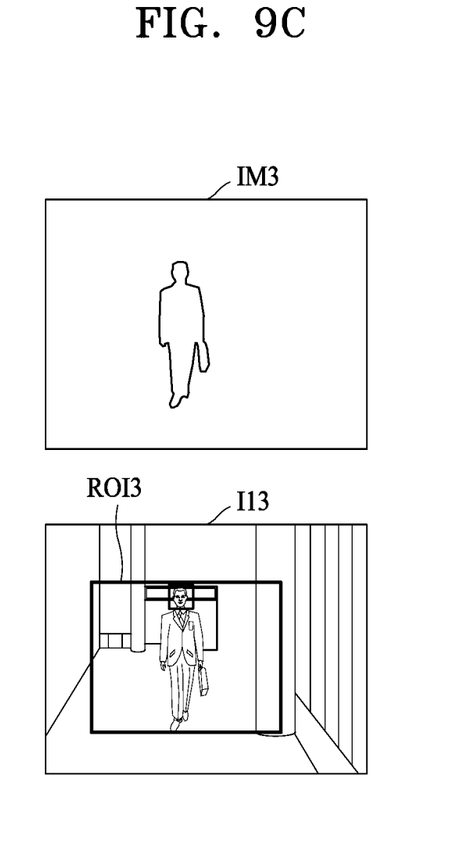
Figure 9D:
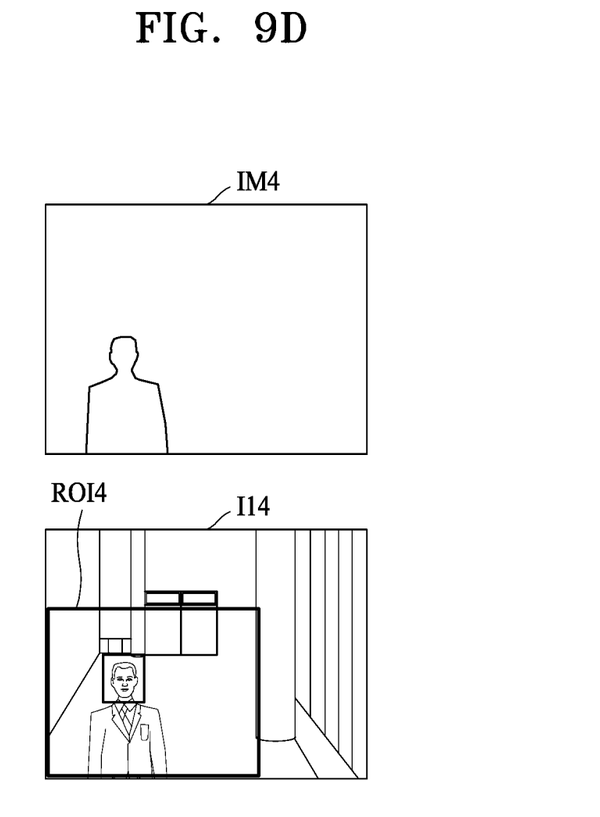

FIG. 8 is a block diagram illustrating the configuration of a camera according to another embodiment of the present disclosure. A camera 200B shown in FIG. 8 is an example of the camera 200 of the security system shown in FIG. 1.

Referring to FIG. 8, the camera 200B may include an optical unit 211, an image sensor 212, and an image processor 220. Hereinafter, detailed descriptions of the components similar to those of the camera 200A according to the embodiment of FIG. 2 will be omitted.

The optical unit 211 may include optics like a zoom lens, a focus lens, and an iris for adjusting the amount of light.

The image sensor 212 may convert light transmitted through the optical unit 211 into an electrical image signal. The image sensor 212 may include an image pickup device like a charge coupled device (CCD) or a complementary metal-oxide semiconductor (CMOS).

The image processor 220 may be realized by any number of hardware and/or software components configured to perform the specified functions. The image processor 220 may include a pre-processor 213, a region setter 214, a first detector 215, a second detector 216, and a storage 217.

The pre-processor 213 may perform signal processing for image quality enhancement on a digital image signal from the image sensor 212 or a digital image signal converted from an analog image signal from the image sensor 212. The pre-processor 213 may store a signal-processed image I in the storage 217.

The first detector 215 may generate an event when an event generation condition set in the signal-processed image I is satisfied. Here, the event may include an event set by a user, such as an appearance of any object, an occurrence of an image designated by the user (e.g., the appearance of an unrecognizable face), an occurrence of a movement, a virtual line passing, a virtual region entry, etc. For example, the first detector 215 may use still images and detect a local motion based on a difference image between a current image and a reference image. It should be appreciated that the method of, performed by the first detector 215, detecting a local motion is not limited to the above-stated method using an image difference, and that various known methods may be applied.

The first detector 215 may store event data ED regarding an occurring event in the storage 217. The first detector 215 may match the event data ED to the signal-processed image I and store the event data MD matched to the signal-processed image I in the storage 217.

The region setter 214 may set a region of interest ROI in the signal-processed image I. The region setter 214 may set the region of interest ROI in the signal-processed image I based on the event data ED generated by the first detector 215. The region setter 214 may set the region of interest ROI that connects a plurality of points surrounding a location where an event occurred. Since the region setter 214 sets the region of interest ROI of an image based on the event data (ED), the size of the region of interest ROI may vary corresponding to the size of an event occurring region. When a plurality of events occur, the region setter 214 may set a region of interest ROI for each event.

The pre-processor 213 may receive a region of interest setting signal from the region setter 214 and output a cropped image Ic generated by cropping a region of interest ROI from the signal-processed image I to the second detector 216. When the size (resolution) of the cropped image Ic exceeds a reference size (resolution) for object detection, the pre-processor 213 may reduce the cropped image Ic to the size of the reference image.

The second detector 216 may detect an object in the cropped image Ic. The second detector 216 may scan the cropped image Ic and detect at least one object having a size equal to or greater than the minimum size that may be detected in the size of the cropped image Ic. The object may be a person, an animal, a vehicle, or a portion thereof (e.g., the face of a person) and may include a stationary object or a moving object. The second detector 216 may detect one or more feature points in the cropped image Ic and detect an object by comparing information regarding the feature points with reference feature information per object.

The second detector 216 may generate metadata MD, which is a set of object detection results. The metadata MD may include position information of an object detected in an image. The position information may include the center coordinates and the size of the object. The second detector 216 may store the metadata MD in the storage 217. The second detector 216 may match the metadata MD to the signal-processed image I and store the metadata MD matched to the signal-processed image I in the storage 217.

The storage 217 may store an image, the event data ED, and the metadata MD. The event data ED and the metadata MD may be text and/or image-based data.

FIGS. 9A-9D illustrate diagrams exemplifying a result that an object is detected in a region of interest set in an image by the camera shown in FIG. 8. The embodiment shown in FIG. 9 shows an example where the size of a region of interest varies according to a movement-based event.

The camera 200B may set a first region of interest ROI1 in a first image I11 according to a movement detection result IM1 in the first image I11. The camera 200B may set second to fourth regions of interest ROI2 to ROI4 in second to fourth images I12 to I14 according to movement detection results IM2 to IM4 in the second image I12 to the fourth image I14 subsequent to the first image I11, respectively. The positions and sizes of first to fourth regions of interest ROI1 to ROI4 may vary depending on the positions and sizes of detected movements.

The camera 200B may display an object detected in the first to fourth regions of interest ROI1 to RO14 as a certain mark (e.g., rectangle shown in FIGS. 9A-9D) in each of the first to fourth images I11 to I14.

Figure 10:
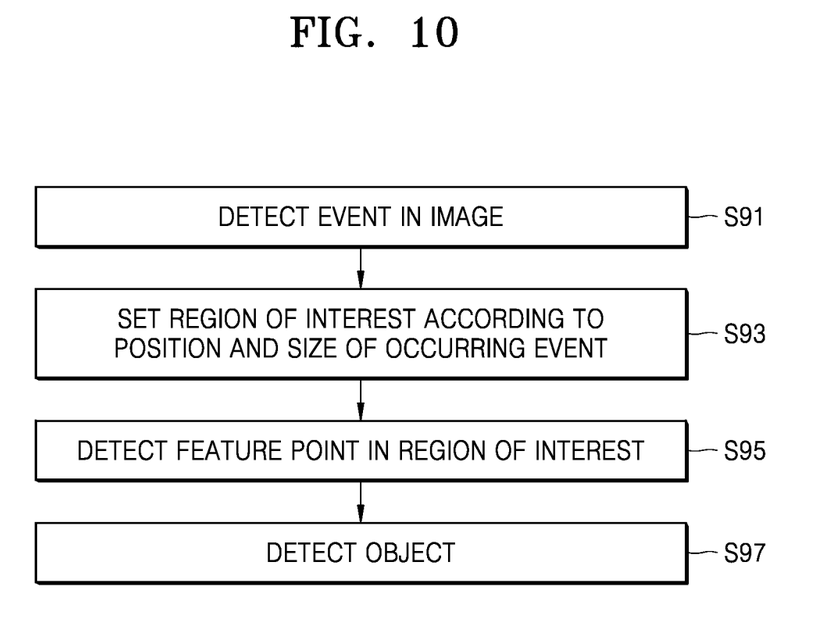
FIG. 10 is a schematic flowchart of an image processing method of a camera according to an embodiment of the present disclosure.

FIG. 10 is a flowchart of an image processing method of a camera, according to an embodiment of the present disclosure. Hereinafter, descriptions identical to those given above with reference to FIGS. 8 and 9 will be omitted.

Referring to FIG. 10, the camera 200B may detect an event in an image (operation S91). The camera 200B may detect an event in an image when a designated event condition is satisfied.

The camera 200B may set at least one region of interest according to the position and size of an event occurring in the image (operation S93). The camera 200B may set a region of interest connecting points of a region including the position of a detected occurring event and a region where the detected event occurs. The position and size of a region of interest may vary depending on the position where an event occurred and the size of a region in which the event occurred. The position and size of a region of interest may vary in proportion to the position where an event occurred and the size of a region in which the event occurred.

The camera 200B may detect at least one feature point corresponding to a pre-set condition in the region of interest (operation S95). The camera 200B may detect at least one feature point corresponding to the feature of an object to be detected in the region of interest.

The camera 200B may detect at least one object within the region of interest based on information regarding detected feature points (operation S97). The camera 200B may detect an object when the information regarding the feature points matches the feature information regarding the object to be detected.

Figure 11:
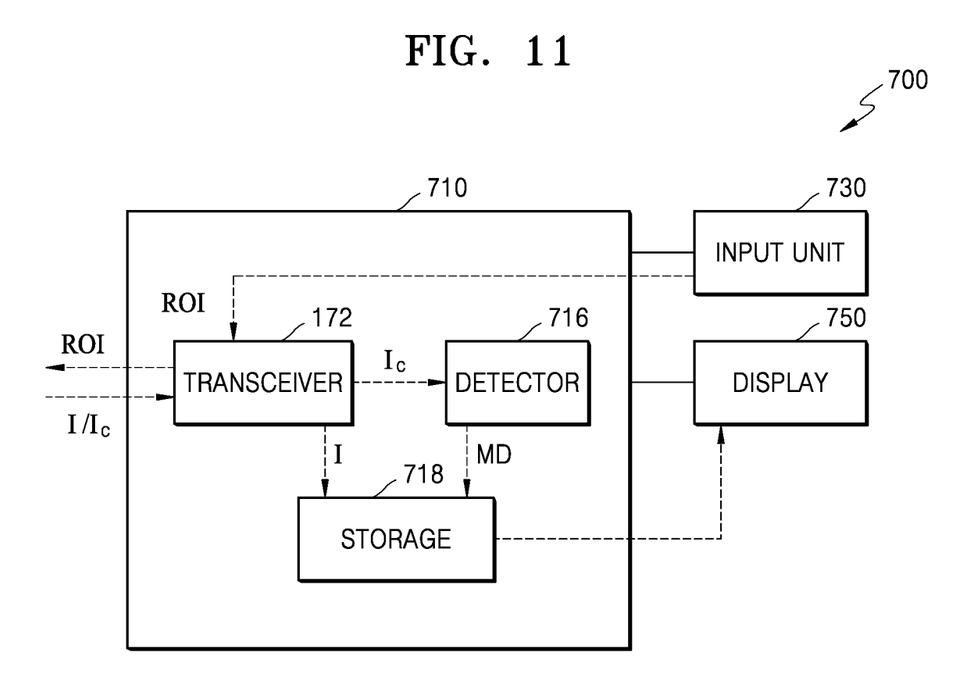
FIG. 11 is a schematic block diagram illustrating the configuration of a managing device according to an embodiment of the present disclosure.

FIG. 11 is a block diagram illustrating the configuration of a managing device according to an embodiment of the present disclosure.

Referring to FIG. 11, a managing device 700 according to an embodiment may include a controller 710, an input unit 730, and a display 750.

The controller 710 may be realized by any number of hardware and/or software components configured to perform the specified functions. For example, the controller 710 may refer to a data processing device embedded in hardware, which has circuitry physically structured to perform functions represented by code or instructions in a program. Examples of the data processing device embedded in hardware may include a microprocessor, a central processing unit (CPU), a processor core, a multiprocessor, an application-specific integrated circuit (ASIC), and a field programmable gate array (FPGA), but the present disclosure is not limited thereto.

The controller 710 may include a transceiver 712, a detector 716, and a storage 718.

The transceiver 712 may receive an image I from the camera 200 and transmit setting information for setting a region of interest ROI to the camera 200.

The image I may be a first resolution image having a high resolution captured by the camera 200 or a second resolution image having a low resolution lower than the first resolution. The transceiver 172 may receive entire image data of the second resolution image and image data of the cropped image Ic generated by cropping a portion of a first resolution image. The cropped image Ic may be an image of a partial region corresponding to the region of interest ROI in the first resolution image.

The setting information may include mode information indicating a region of interest fixed mode or a region of interest variable mode. The setting information may include region information for setting a region of interest ROI in the region of interest fixed mode or the region of interest variable mode. In the region of interest fixed mode, the region information may be point data indicating a plurality of pixel positions. The region information in the region of interest variable mode may be an event occurring condition.

The transceiver 712 may receive a user input for setting the mode information and the region information from the input unit 730 and transmit the input to the camera 200.

The transceiver 712 may receive image data regarding the cropped image Ic corresponding to the region of interest ROI set in the region of interest fixed mode or the region of interest variable mode according to setting information from the camera 200.

The detector 716 may detect an object corresponding to a set condition by analyzing the image data regarding the cropped image Ic that is input through the transceiver 172 and received from the camera 200. The detector 716 may generate metadata MD, which is a set of object detection results. In the region of interest fixed mode, the cropped image Ic may be image data of a region of interest ROI designated by a user in the first resolution image. In the region of interest variable mode, the cropped image Ic may be image data of a region of interest ROI including a region in which an event occurred in the first resolution image.

The storage 718 may store the image I and the metadata MD.

The display 750 may read the image I and the metadata MD from the storage 718 and display an object detection result regarding the region of interest ROI corresponding to the metadata MD in the image I. The image I may be the second resolution image. The display 750 may display the region of interest ROI and a mark marking an object detected from the first resolution image in the second resolution image.

In embodiments of the present disclosure, when the resolution of an image that may be processed by an object detector is fixed to a low resolution (e.g., a maximum of 640×480 pixels), instead of reducing an entire high resolution (e.g., 3840×2160 pixels) image to a low resolution image, a partial image having a size corresponding to that of a low resolution is cropped from a high resolution image and a cropped image is processed by the object detecting unit. In other words, image data analyzed by the object detector is image data of the high resolution image. Therefore, an object may be detected from image data of a high-resolution image, rather than detection of an object from image data of a low resolution image generated by an image reduction, and thus, a remote object may be easily detected.

Also, in embodiments of the present disclosure, when a low resolution image converted from a high resolution original image is an input image, an object is detected by analyzing image data of a region of interest in the high resolution original image, and thus, the accuracy of object detection may be maintained high even when a low resolution image is displayed on a display.

A process of detecting and recognizing faces of all possible sizes for an entire image needs scanning. Therefore, the higher the resolution of an image is, the longer the scanning process may take. A camera according to embodiments of the present disclosure may reduce an object detection time and the amount of calculations by detecting an object by analyzing only a region of interest in a high resolution image rather than the entire high resolution image. Also, a small object at a distance may be detected and recognized by analyzing only a region of interest of a high resolution image without reducing the entire high resolution image to a low resolution image.

The image processing method according to an embodiment of the present disclosure may be implemented as computer-readable code on a computer-readable recording medium. The computer-readable recording medium includes all kinds of recording apparatuses in which data that may be read by a computer system is stored. Examples of the computer-readable recording medium include ROM, RAM, a CD-ROM, magnetic tape, a floppy disk, an optical data storage, etc. The computer-readable recording medium can also be distributed over network-coupled computer systems so that the computer-readable code is stored and executed in a distributed fashion. In addition, functional programs, code, and code segments for implementing the present disclosure may be easily inferred by programmers of the technical field to which the present disclosure belongs.

Although aspects of the present invention are described with reference to the embodiments illustrated in the accompanying drawings, they are merely examples, and one of ordinary skill in the art will understand that various modifications and other equivalent embodiments may be derived therefrom. Accordingly, the true scope of the present disclosure should be determined only by the appended claims.

The invention claimed is:

1. An image processing method of a camera, the image processing method comprising:
   receiving region information of an input image having a first resolution;
   obtaining image data extracted from a region of an original resolution image corresponding to a region of the input image set according to the region information the original resolution image having a second resolution that is higher than the first resolution; and
   analyzing the image data of the original resolution image and detecting an object in the region of the original resolution image according to one or more object detection conditions.

2. The image processing method of claim 1, further comprising displaying a minimum size of an object detectable in the region of the original resolution image, the minimum size varying according to the size of the region.

3. The image processing method of claim 2, wherein the minimum size of the object detectable in the region of the original resolution image is proportional to the size of the region.

4. The image processing method of claim 1, further comprising displaying a minimum size of an object detectable in the region of the original resolution image, the minimum size varying according to a type of the object to be detected.

5. The image processing method of claim 1, further comprising scheduling object detection of a plurality of regions by allocating an order to the plurality of regions.

6. The image processing method of claim 1, wherein the receiving of the region information comprises
   receiving a position designated by a user in the input image as the region information.

7. The image processing method of claim 1, wherein the receiving of the region information comprises
   receiving an event detected in the input image as the region information.

8. The image processing method of claim 7, wherein a position and a size of the region vary according to an event occurring position and a size of an event occurring region in the input image.

9. The image processing method of claim 7, wherein the event is a movement of the object.

10. A camera comprising:
    a region setter configured to receive region information and set a region in an input image having a first resolution; and
    a detector configured to;

obtain image data extracted from a region of an original resolution image corresponding to a region of the input image set according to the region information, the original resolution image having a second resolution that is higher than the first resolution; and analyze the image data of the original resolution image and detect an object in the region of the original resolution image according to one or more object detection conditions.

11. The camera of claim 10, wherein the region setter is further configured to display a minimum size of an object detectable in the region of the original resolution image, the minimum size varying according to the size of the region.

12. The camera of claim 11, wherein the minimum size of the object detectable in the region of the original resolution image is proportional to the size of the region.

13. The camera of claim 10, wherein the region setter is configured to display a minimum size of an object detectable in the region of the original resolution image, the minimum size varying according to a type of the object to be detected.

14. The camera of claim 10, wherein the region setter is configured to schedule object detections of a plurality of regions by allocating an order to the plurality of regions.

15. The camera of claim 10, wherein the region setter is configured to receive a position designated by a user in the input image as the region information.

16. The camera of claim 10, wherein the region setter is configured to receive an event detected in the input image as the region information.

17. The camera of claim 16, wherein a position and a size of the region vary according to an event occurring position and a size of an event occurring region in the input image.

18. The camera of claim 16, wherein the event is a movement of the object.

19. An image processing method of a server, the image processing method comprising:

receiving a second resolution image obtained by changing a first resolution image having an original resolution from a camera;

transmitting setting information for setting a region to the camera;

obtaining image data extracted from a region of the first resolution image corresponding to a region of the second resolution image based on the setting information, the first resolution image having a higher resolution than the second resolution image;

analyzing the extracted image data and detecting an object in the region of the first resolution image according to one or more object detection conditions; and displaying an object detected based on the first resolution image in the second resolution image on a display.

20. The image processing method of claim 19, wherein a minimum size of an object detectable in the region of the first resolution image varies according to at least one of a size of the region of the first resolution image and a type of the object to be detected displayed in the region of the first resolution image.

* * * * *